(12) United States Patent
Takenaka

(10) Patent No.: US 7,497,296 B2
(45) Date of Patent: Mar. 3, 2009

(54) ALL-WHEEL-DRIVE MOTORCYCLE

(75) Inventor: Masahiko Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 11/384,387

(22) Filed: Mar. 21, 2006

(65) Prior Publication Data

US 2006/0213713 A1 Sep. 28, 2006

(30) Foreign Application Priority Data

Mar. 24, 2005 (JP) ............................. 2005-086113

(51) Int. Cl.
*B62M 7/00* (2006.01)
(52) U.S. Cl. ..................... 180/224; 180/307; 180/308
(58) Field of Classification Search ................ 180/224, 180/307, 308, 223, 65.5, 205–207
See application file for complete search history.

(56) References Cited

U.S. PATENT DOCUMENTS

| | | | | |
|---|---|---|---|---|
| 2,562,881 | A * | 8/1951 | Baldwin et al. .............. 180/2.1 |
| 3,499,285 | A * | 3/1970 | Nicholls ..................... 60/487 |
| 4,157,739 | A * | 6/1979 | Frye ............................ 180/224 |
| 5,184,838 | A * | 2/1993 | Becoat ........................ 280/259 |
| 5,873,428 | A * | 2/1999 | Ohshita et al. .............. 180/224 |
| 6,015,021 | A * | 1/2000 | Tanaka et al. ............... 180/206 |
| 6,059,534 | A * | 5/2000 | Kotake et al. ................ 417/15 |
| 6,505,699 | B1 * | 1/2003 | Christini et al. ............ 180/224 |
| 6,685,437 | B2 * | 2/2004 | Koenig et al. ................ 417/15 |
| 7,137,315 | B2 * | 11/2006 | Chang et al. ............... 74/730.1 |

FOREIGN PATENT DOCUMENTS

| | | |
|---|---|---|
| DE | 1312664 U | 7/1934 |
| EP | 1151913 A1 | 11/2001 |
| JP | 2000-229596 A | 8/2000 |

* cited by examiner

*Primary Examiner*—Paul N Dickson
*Assistant Examiner*—Maurice Williams
(74) *Attorney, Agent, or Firm*—Birch, Stewart, Kolasch & Birch, LLP

(57) ABSTRACT

An all-wheel-drive vehicle in which flexibility in setting the diameter of a driven gear is increased. In an all-wheel-drive vehicle in which an engine drives a rear wheel and also drives a hydraulic pump, and oil pressure generated by the hydraulic pump is supplied to a hydraulic motor for driving a front wheel. A front wheel hub provided on the front wheel is formed into a cup-shaped hub provided with a recess portion covered by a cover. The hydraulic motor is supported by the cover. A drive gear is provided on an output shaft of the hydraulic motor and a driven gear is provided in the recess portion of the hub with the driven gear being provided on the side of an axle.

16 Claims, 4 Drawing Sheets

ALL-WHEEL-DRIVE MOTORCYCLE

CROSS-REFERENCE TO RELATED APPLICATIONS

The present application claims priority under 35 USC 119 to Japanese Patent Application No. 2005-086113 filed on Mar. 24, 2005 the entire contents of which are hereby incorporated by reference.

FIELD OF THE INVENTION

The present invention relates to an all-wheel-drive motorcycle in which an engine drives a rear wheel and also drives a hydraulic pump, and oil pressure generated by the hydraulic pump is supplied to a hydraulic motor for driving a front wheel.

DESCRIPTION OF BACKGROUND ART

Normally, in a motorcycle, only a rear wheel is driven via a chain or the like from an output shaft of an engine. Thus, a front wheel together with the rear wheel are propelled for traveling on rough-terrain or snow in the related art.

An all-wheel-drive motorcycle in which a rear wheel is driven by an engine and a front wheel is driven by a hydraulic motor is proposed, for example, in JP-A-2000-229596, see FIG. 10.

FIG. 10 of JP-A-2000-229596 is a cross-sectional view of a front wheel hub 41, note that the following reference numerals are used in JP-A-2000-229596, that includes a boss 41b for penetrating an axle formed integrally at an axial center portion of a bottom portion 41a with a double-row of ball bearings 61 for rotatably supporting the boss 41b. An internal gear 64 is fixed to a boundary section between the bottom portion 41a and a cylindrical portion 41c of the hub 41. An output gear 65 (hereinafter referred to as the drive gear 65) of a hydraulic motor 7 is engaged with the internal gear 64 (hereinafter referred to as the driven gear 64) so that the hub 41 is driven by the hydraulic motor 7.

Since the driven gear 64 is provided on the inner periphery of the hub 41, the diameter of the driven gear 64 can only be set to a diameter larger than that of the drive gear 65. Thus, the driven gear 64 has little flexibility in setting the diameter thereof.

SUMMARY AND OBJECTS OF THE INVENTION

Accordingly, an object of an embodiment of the present invention is to provide an all-wheel-drive motorcycle for improving the flexibility in setting the diameter of a driven gear.

It is an object of an embodiment of the present invention to provide an all-wheel-drive motorcycle in which an engine drives a rear wheel and also drives a hydraulic pump. Oil pressure generated by the hydraulic pump is supplied to a hydraulic motor for driving a front wheel. A front wheel hub is provided on the front wheel and is formed into a cup-shaped hub provided with a recess portion, the recess portion of the hub is covered by a cover with the hydraulic motor being supported by the cover. A drive gear is provided on an output shaft of the hydraulic motor, and a driven gear is provided in the recess portion of the hub wherein the driven gear is provided on the side of an axle.

According to an embodiment of the present invention the diameter of the drive gear is set to be larger than the diameter of the driven gear.

According to an embodiment of the present invention the output shaft of the hydraulic motor is arranged so as to be inclined with respect to the axle by employing bevel gears as the drive gear and the driven gear. The bevel gears are arranged so that smaller diameter portions face toward the inside of the recess portion.

According to an embodiment of the present invention, in the all-wheel-drive motorcycle in which the engine drives the rear wheel and also drives the hydraulic pump, and oil pressure generated by the hydraulic pump is supplied to the hydraulic motor for driving the front wheel, the drive gear is provided on the output shaft of the hydraulic motor, and the driven gear is provided on the hub. In view of the fact that the driven gear is provided on the side of the axle, it is easy to set the diameter of the driven gear to be smaller than the diameter of the drive gear. In addition, it is also easy to set the former to be larger than the latter.

Since it is easy to change the diameter of the driven gear, flexibility in setting the diameter of the driven gear is advantageously increased.

According to an embodiment of the present invention the drive gear is provided on the output shaft of the hydraulic motor with the driven gear being provided in the recess portion of the hub, and the diameter of the drive gear is set to be larger than the driven gear.

Since the number of revolutions of the hydraulic motor is smaller than the number of revolutions of the front wheel, the number of revolutions of the hydraulic motor can be reduced. Thus, a lowering of the output or the mileage due to the hydraulic pressure loss can be advantageously restrained.

According to embodiment of the present invention, since the output shaft of the hydraulic motor is arranged so as to be inclined with respect to the axle by employing the bevel gears for the drive gear and the driven gear and arranging the bevel gears so that the small diameter portions face the inside of the recess portion, even though the diameter of the drive gear is increased, the arrangement of a seal member for sealing between the hub and the cover is not affected. Thus, upsizing of the hub in the direction of the axle can be restrained.

In addition, since the output shaft of the hydraulic motor is arranged to be inclined with respect to the axle, even though the diameter of the drive gear provided on the output shaft is increased, upsizing of the hub in the radial direction is restrained. Thus, the drive gear and the driven gear can be arranged compactly around the axle of the front wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below on the basis of the drawings.

Figure 1:
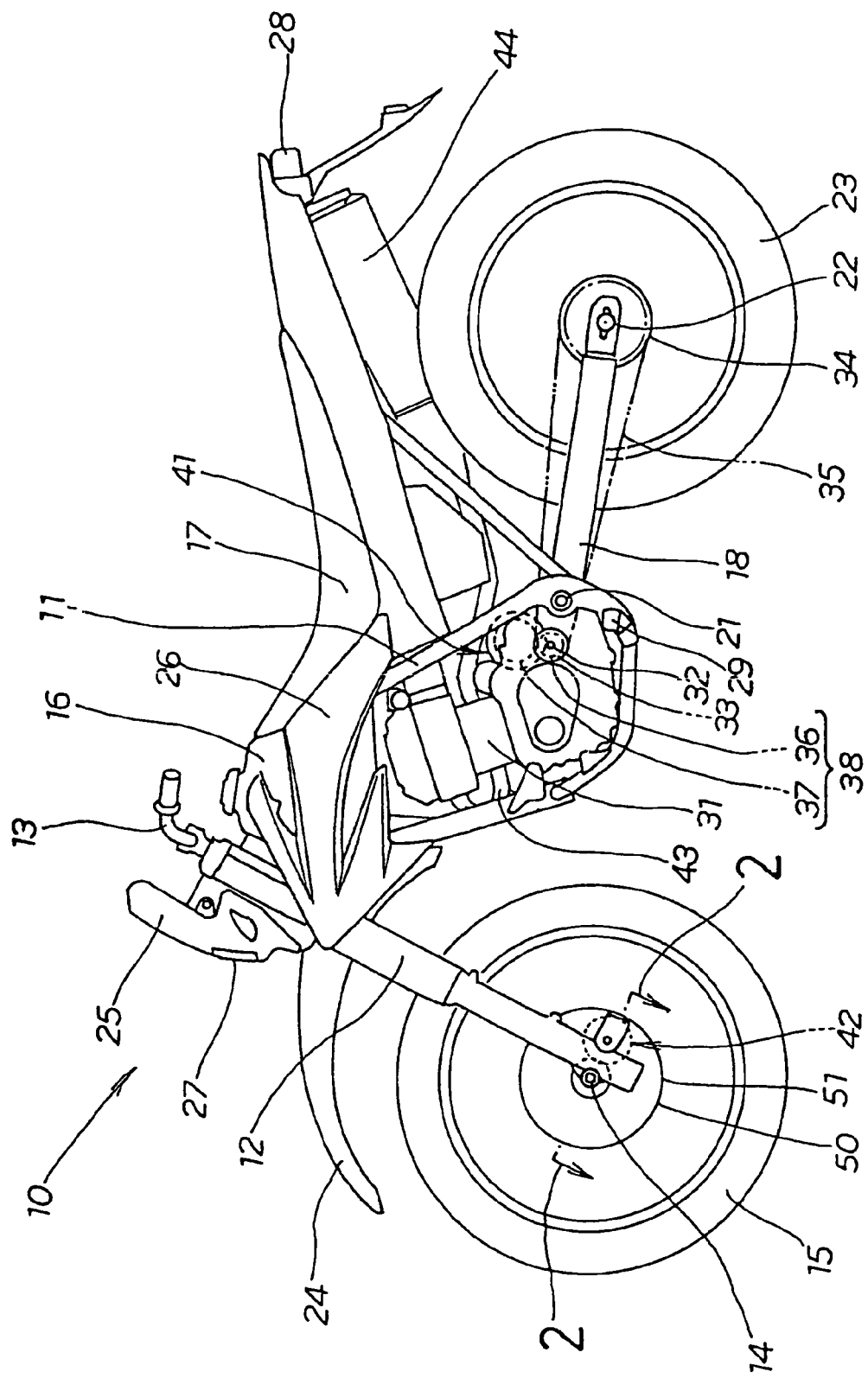
FIG. 1 is a side view of an all-wheel-drive motorcycle according to the present invention.

FIG. 1 is a side view of an all-wheel-drive motorcycle according to the present invention. An all-wheel-drive motorcycle 10 includes a vehicle body frame 11 with a front fork 12 steerably mounted to a front portion of the vehicle body frame 11 and a steering handle 13 mounted to an upper portion of the front fork 12. A front wheel 15 is mounted to a lower portion of the front fork 12 via a front wheel axle 14. A fuel tank 16 and a passenger seat 17 are arranged on the vehicle body frame 11 from the front to the rear. A swing arm 18 is mounted to a rear portion of the vehicle body frame 11 so as to be capable of moving in the vertical direction about a pivot shaft 21 with a rear wheel 23 being mounted to a rear end of the swing arm 18 via a rear wheel axle 22.

A front fender 24 is provided with a front cowl 25, a side cowl 26, a headlight 27, a stop lamp 28 and a step 29.

A drive system for the motorcycle 10 includes an engine 31 mounted across the vehicle body frame 11. An engine sprocket 33 is mounted to an output shaft 32 of the engine 31 with a rear wheel sprocket 34 being mounted to the rear wheel 23. A chain 35 is provided for transmitting a drive force, the chain 35 connects the rear wheel sprocket 34 with the engine sprocket 33. A hydraulic pump 41 is provided for driving the front wheel and is connected to the output shaft 32 of the engine via a drive force transmitting means 38 including a gear 36 and a gear 37. A hydraulic motor 42, for driving the front wheel 15, is mounted to the lower portion of the front fork 12. A hydraulic pipe, not shown, is connected between the hydraulic motor 42 and the hydraulic pump 41.

Since the hydraulic pump 41 is arranged above the output shaft 32 of the engine and near a center of gravity of the motorcycle 10, the influence to the weight distribution between the front wheel 15 and the rear wheel 23 is negligible.

In other words, the all-wheel-drive motorcycle 10 drives the rear wheel 23 by transmitting the power of the engine 31 to the rear wheel 23 via the chain 35. Hydraulic pressure is supplied to the hydraulic motor 42 of the front wheel 15 by the engine-driven hydraulic pump 41. Thus, the front wheel 15 is driven by the hydraulic motor 42.

In addition to this, a muffler 44 is mounted from the engine 31 to the rear via an exhaust pipe 43.

The structure around the front wheel 15 will be described with the next drawing in detail.

Figure 2:
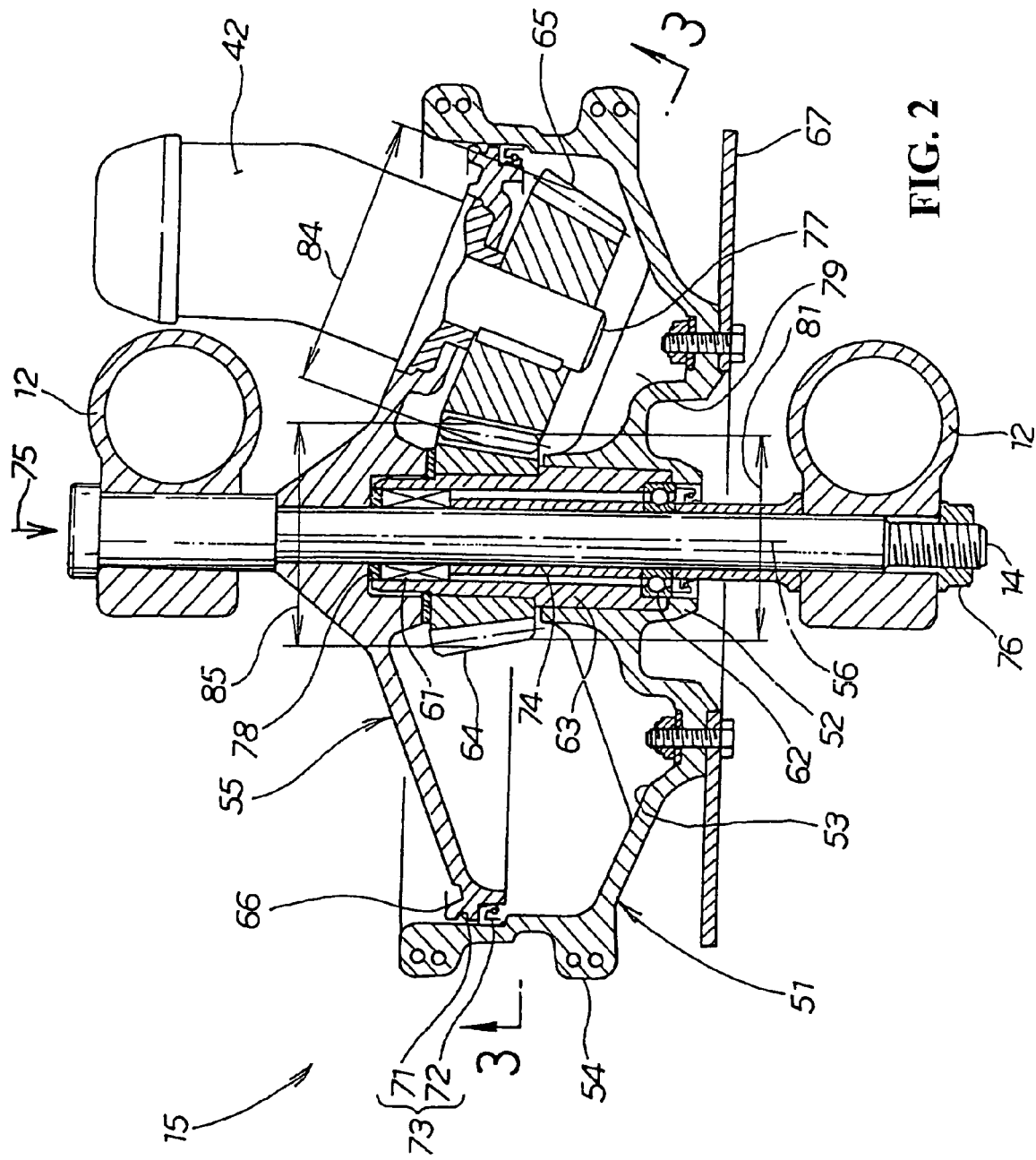
FIG. 2 is a cross-sectional view taken along the line 2-2 in FIG. 1.

FIG. 2 is a cross-sectional view taken along the line 2-2 in FIG. 1. A front wheel hub structure 50 is a part of the front wheel 15. The hub 51 includes a boss portion 52 for allowing passage of the front wheel axle 14, a recess portion 53, and a cylindrical portion 54. The hydraulic motor 42 is provided for transmitting power to the front wheel hub 51. A cover 55 is provided for fixedly supporting the hydraulic motor 42 and for covering the recess portion 53 of the front wheel hub 51. The front wheel axle 14 fixes the cover 55 to the front fork 12. The boss portion 52, provided at an axial center 56 of the front wheel hub 51, is provided for allowing passage of the front wheel axle 14. A needle bearing 61 is provided with a single-row angular-shaped radial ball bearing 62 be interposed between the boss portion 52 and the front wheel axle 14 with a sleeve 63 kept in abutment with the radially outside of the bearings 61, 62 and fixed to the boss portion 52. A driven gear 64 is fitted on the outer periphery of the sleeve 63. A drive gear 65, to be engaged with the driven gear 64, is provided on an output shaft 77 of the hydraulic motor 42. A plate 67 is provided for a disk brake. A collar 78 is mounted adjacent to the needle bearing 61.

In order to prevent foreign substances such as water, dust or dirt from entering between an outer peripheral edge 66 of the cover 55 and the cylindrical portion 54 of the hub 51 and attaching on the drive gear 65 and the driven gear 64, sealing means 73 including a labyrinth portion 71 and a seal member 72 is provided.

Since the recess portion 53 of the hub 51 with the drive gear 65 and the driven gear 64 arranged therein is configured to be a dual structure with the labyrinth portion 71 and the seal member 72, entry of the foreign substances into the recess portion 53 of the hub 51 can be prevented.

A collar member 74 is a member for limiting the axial (also referred to as the direction of the axle) movement by being placed between the needle bearing 61 and the single-row angular-shaped radial ball bearing 62.

The front wheel axle 14 is a member to be inserted in the direction indicated by an arrow 75 and tightened at one end thereof by a shaft nut 76.

An output shaft 77 of the hydraulic motor is arranged obliquely with respect to the front wheel axle 14 with a diameter 85 of the driven gear 64, mounted to the front wheel hub 51, being smaller than a diameter 84 of the drive gear 65 mounted to the output shaft 77 of the hydraulic motor 42. A gear mounted to the output shaft 77 of the hydraulic motor 42 is a bevel gear.

In other words, the front wheel hub 51 is the cup-shaped hub provided with the recess portion 53, and the recess portion 53 of the hub 51 is covered by the cover 55. Then, the hydraulic motor 42 is supported by the cover 55, the drive gear 65 is mounted to the output shaft 77 of the hydraulic motor 42, and the driven gear 64 is mounted to the recess portion 53 of the hub 51.

In this manner, since the output shaft 77 of the hydraulic motor is arranged obliquely with respect to the axle 14, a space is defined between the inner side of the annular recess portion 53 of the hub 51 to which the plate 67 is mounted. Thus, a front portion of the drive gear 65, and a rib 79 can be provided using the space. Since the rib 79 can be provided, the strength of the hub 51 can be increased without increasing the thickness of the hub 51.

In addition, by employing the bevel gears as the drive gear 65 and the driven gear 64, and arranging the bevel gear in such a manner that a smaller diameter portion 81 of the bevel gear is directed inwardly of the recess portion 53, the output shaft 77 of the hydraulic motor 42 is inclined with respect to the front wheel axle 14.

Figure 3:
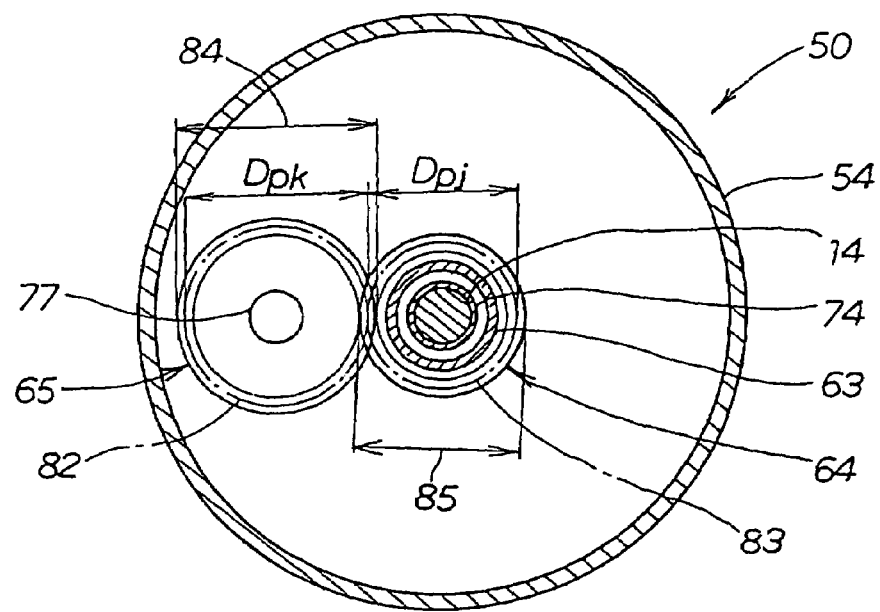
FIG. 3 is a cross-sectional view taken along the line 3-3 in FIG. 2.

FIG. 3 is a cross-sectional view taken along the line 3-3 in FIG. 2. The engaging portion includes the collar member 74 that is fitted on the periphery of the front wheel axle 14. The sleeve 63, on the rotating side with respect to the front wheel axle 14, is arranged at a distance from the collar member 74. The driven gear 64 is fixed to the sleeve 63 with the driven gear 64 being engaged with the drive gear 65 provided on the output shaft 77 of the hydraulic motor 42 (see FIG. 2).

A pitch circle 82 of the drive gear 65 is provided together with a pitch circle 83 of the driven gear 64. The reduction gear ratio is determined by the ratio between the diameters of the two pitch circles, and a pitch circle diameter Dpj of the driven gear 64 is set to be larger than a pitch circle diameter Dpk of the drive gear 65.

In other words, the drive gear 65 is mounted to the output shaft 77 of the hydraulic motor, the driven gear 64 is mounted to the recess portion 53 of the hub 51 (see FIG. 2), and the diameter 84 of the drive gear 65 is set to be larger than the diameter 85 of the driven gear 64. A cylindrical portion 54 of the hub 51 is provided.

Figure 4:
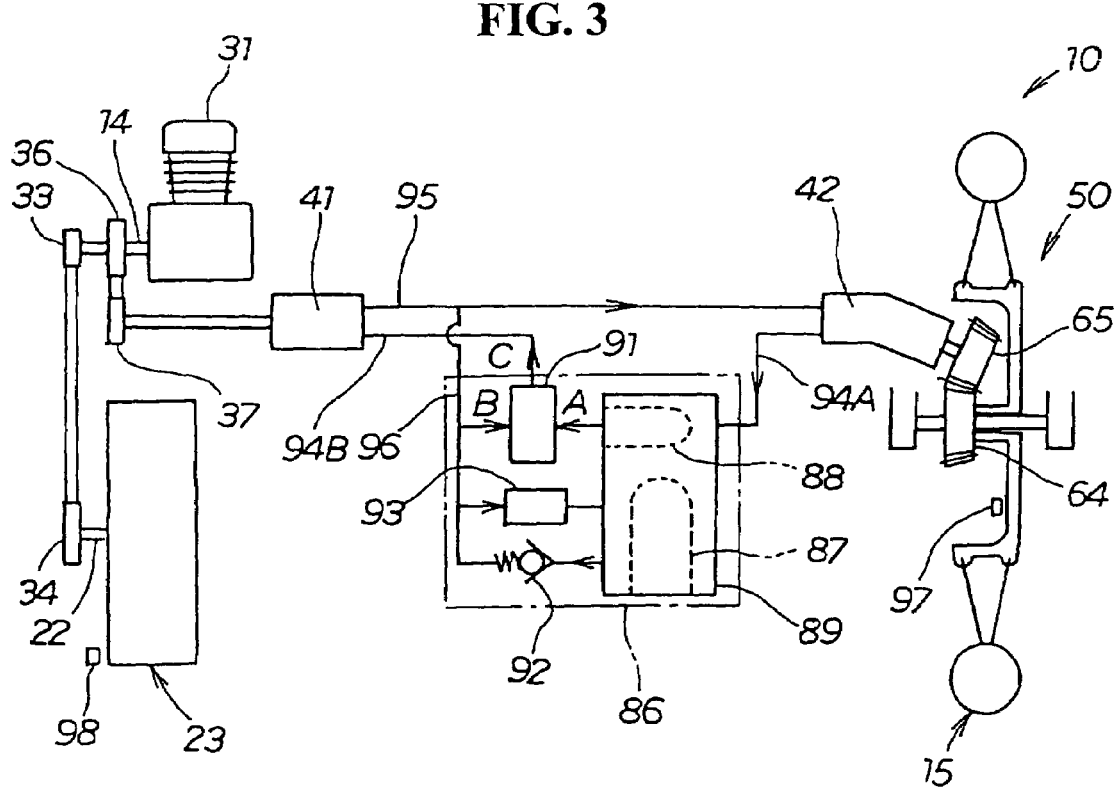
FIG. 4 is a hydraulic system diagram of the all-wheel-drive motorcycle according to the present invention.

FIG. 4 is a hydraulic system chart of the all-wheel-drive motorcycle according to the present invention, showing the all-wheel-drive motorcycle 10 in which the engine 31 drives the rear wheel 23 and also drives the hydraulic pump 41. Oil pressure generated by the hydraulic pump 41 is fed to the hydraulic motor 42, so that the front wheel 15 is driven by the hydraulic motor 42. An oil control means 86, for controlling the oil pressure, is interposed between the hydraulic pump 41 and the hydraulic motor 42.

The oil control means 86 includes a pressurizing tank 89 including pressurizing means 87 and a filter 88 with an operation switching means 91 for switching the discharging port of the oil, a check valve 92 and a safety valve 93. The oil control means 86 is configured by connecting a return pipe 94A from the hydraulic motor 42 to the pressurizing tank 89 having the pressurizing means 87 and the filter 88 integrated therein. The operation switching means 91 is connected to the pressurizing tank 89. The operation switching means 91 is connected by a return pipe 94B to the hydraulic pump 41. The hydraulic pump 41 is connected by an output pipe 95 to the hydraulic motor 42. A bypass pipe 96 is connected to the output pipe 95 with the check valve 92 being interposed. The safety valve 93 is connected to the bypass pipe 96. The check valve 92 and the safety valve 93 are connected to the pressurizing tank 89.

The check valve 92 is arranged so that the oil flows only in the direction from the pressurizing tank 89 to the bypass pipe 96, and the safety valve 93 is arranged in the orientation which allows oil flow from the bypass pipe 96 toward the pressurizing tank 89 only when the pressure is higher than a predetermined pressure.

The hydraulic pump 41 is a swash plate type axial pump, and the hydraulic motor 42 is an axial piston motor.

In this embodiment, front and rear wheel speed sensors 97, 98 can be attached to the front wheel 15 and the rear wheel 23, respectively. By providing the wheel speed sensors 97, 98, a wheel speed signal of the front wheel 15 and a wheel speed signal of the rear wheel 23 can be detected separately, and these signals can be used for hydraulic control.

Hereinafter, a description will be made about specific elements in the hydraulic system chart.

First, the pressurizing means 87 is mounted to the pressurizing tank 89. By providing the pressurizing means 87, the hydraulic pressure between the hydraulic motor 42 and the hydraulic pump 41 increases at the time of high load, whereby the generation of air bubbles in the return pipes 94A, 94B by the lowering of the oil pressure can be prevented.

Subsequently, the check valve 92 is arranged between the pressurizing tank 89 and the bypass pipe 96. The check valve 92 is for preventing the rotation of the front wheel 15 from being hindered by the check valve 92 when the number of revolutions of the rear wheel 23 is lowered to a value lower than the number of revolutions of the front wheel 15. Even when the number of revolutions of the hydraulic pump 41 is lowered, oil of an amount corresponding to the difference in the number of revolutions is returned from the check valve 92 through the bypass pipe 96 to the output pipe 95. Thus, the hydraulic system such as the hydraulic motor 42 is prevented from being subjected to a load from the rotation of the front wheel 15, whereby the rotation of the front wheel 15 is prevented from being impaired.

The safety valve (relief valve) 93 is provided between the pressurizing tank 89 and the bypass pipe 96.

By providing the safety valve 93, when the hydraulic pressure in the output pipe 95 is significantly increased, for example if the rear wheel 23 slips during traveling on a rough-terrain and the rotation of the hydraulic pump 41 is increased, the safety valve 93 is opened and oil enters into the pressurizing tank 89 from the output pipe 95 through the bypass pipe 96 and the safety valve 93. Therefore, a significant increase in hydraulic pressure can be avoided.

An operation of the oil control means 86 will be described.

In the all-wheel-drive mode, when a port A and a port C of the operation switching means 91 are brought into communication, and a port B is closed, oil circulates in sequence from the hydraulic pump 41 through the output pipe 95, the hydraulic motor 42, the oil control means 86 composed of the pressurizing tank 89, the filter 88, and the operation switching means 91, the return pipe 94B, the hydraulic pump 41 to rotate the hydraulic motor 42.

When the rear wheel 23 and the front wheel 15 rotate at substantially the same wheel speed, the hydraulic motor 42 rotates simultaneously with the wheel speed of the front wheel 15. Therefore, when the wheel speed of the rear wheel 23 and the front wheel 15 is substantially the same, a drive force by the hydraulic motor 42 is not generated.

When the possibility of occurrence exists during traveling on snow or during traveling on rough-terrain and the wheel speed of the rear wheel 23 is increased to a wheel speed higher than that of the front wheel 15, the hydraulic pressure between the hydraulic pump 41 and the hydraulic motor 42 is increased, and the hydraulic motor 42 applies the drive force to the front wheel 15.

On the other hand, in the rear-wheel-drive mode, when the ports A-C of the operation switching means 91 are brought into communication with each other, the output pipe 95 and the return pipe 94B are brought into communication by the bypass pipe 96 and the operation switching means 91. Therefore, the hydraulic pressure applied to the hydraulic motor 42 is lowered. Thus, the front wheel 15 is not driven by the hydraulic motor 42. Since the hydraulic motor 42 is driven and rotated by the front wheel 15, oil circulates in sequence from the hydraulic motor 42→the return pipe 94A→the oil control means 86→the bypass pipe 96→the output pipe 95, and the hydraulic motor 42 is not affected by the hydraulic pump 41.

Switching between the all-wheel-travel mode and the rear-wheel-travel mode may be performed manually. Alternatively, it is also possible to detect the speed difference from the signal of the front wheel speed sensor 97 and the signal of the rear wheel speed sensor 98 so that the mode is switched from the rear-wheel-travel mode to the front-wheel-travel mode automatically.

FIGS. 5(*a*) and 5(*b*) are explanatory drawings showing a structure of the front hub of the all-wheel-drive motorcycle.

FIG. 5(*b*) shows that the diameter of the drive gear 65 is larger than that of the driven gear 64.

The driven gear 64 and the drive gear 65 may be, for example, a spur gear or a helical gear.

In addition to FIG. 5(*b*), FIG. 5(*a*) shows that bevel gears are employed as the drive gear 65 and the driven gear 64 and arranged so that the smaller diameter portions 81 of the bevel gears face toward the inside of the recess portion 53, so that the output shaft 77 of the hydraulic motor 42 is inclined with respect to the front wheel axle 14.

Figure 5A:
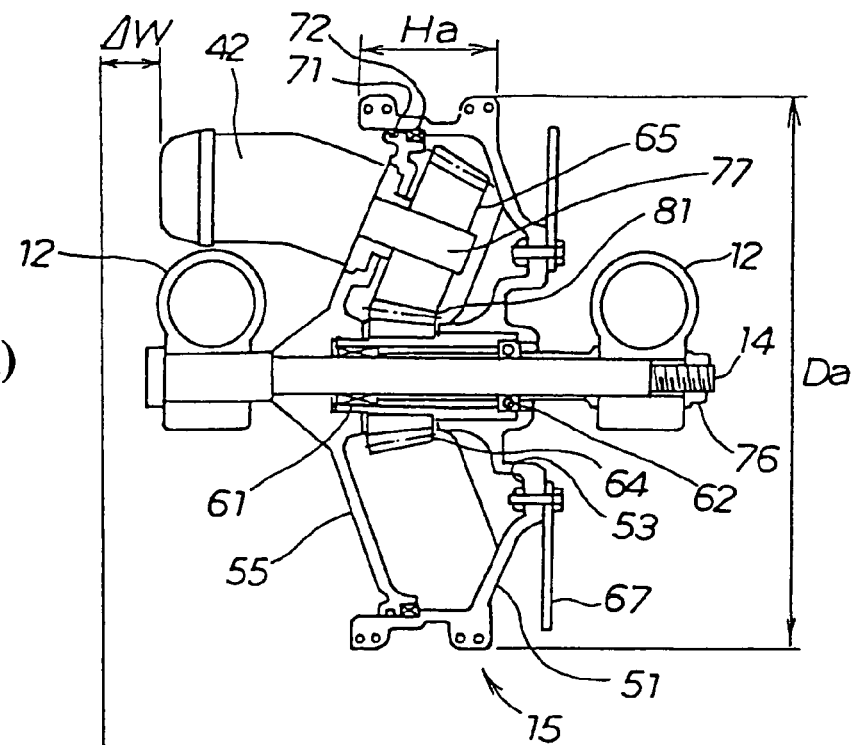
FIG. 5(a) and FIG. 5(b) are explanatory drawings showing structure of a front wheel hub of the all-wheel-drive motorcycle.
Figure 5B:
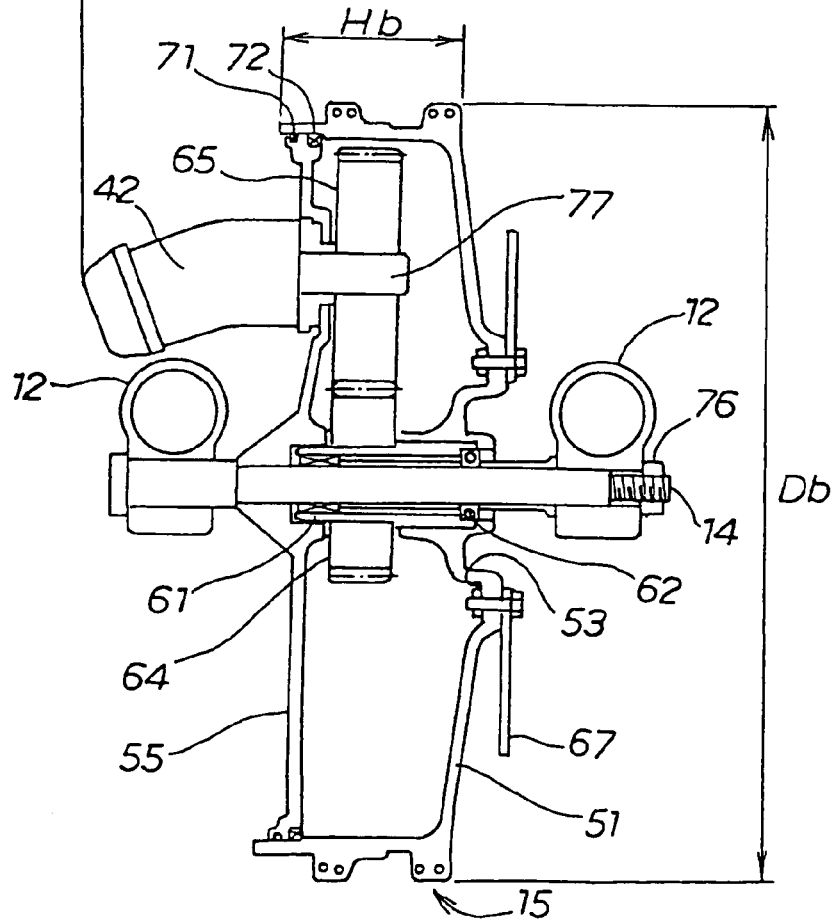

The sizes of FIG. 5(b) and FIG. 5(a) are compared in the axial direction and in the radial direction.

By arranging the drive gear 65 so as to be inclined and engaged with the bevel gear, the occupied width of the hydraulic motor 42 in the direction of the axle in the case of FIG. 5(a) can be reduced by ΔW in comparison with the case of FIG. 5(b). In addition, the relation between the widths Ha, Hb of the hub 51 is Ha<Hb, and the labyrinth portion 71 and the seal member 72 are arranged at the widthwise center side. Thus, an increase in the width of the hub can be avoided.

In the radial direction, the relation of the outer diameters Da, Db of the hub is Da<Db, and by arranging the drive gear 65 so as to be inclined and engaging with the bevel gear, the height of the hub in FIG. 5(a) can be reduced by the length (Db-Da) in comparison with that in FIG. 5(b).

Therefore, by arranging the drive gear 65 so as to be inclined and engaging with the bevel gear, the size of the hub 51 can be reduced both in the direction of the axle and in the radial direction.

Consequently, the size and the weight of the hub 51 can be reduced.

An operation of the present invention will be described below.

In FIGS. 5(a) to 5(b), since the drive gear 65 is provided on the output shaft 77 of the hydraulic motor 42, and the driven gear 64 is provided on the axle side which is integrated with the hub 51, flexibility in setting the diameter of the driven gear can be increased.

In addition, since the drive gear 65 is provided on the output shaft 77 of the hydraulic motor 42, and the driven gear 64 is provided in the recess portion 53 of the hub 51, the diameter of the drive gear 65 may be set to be larger than the driven gear 64. Thus, the number of revolutions of the hydraulic motor 42 is set to be lower than the number of revolutions of the front wheel 15.

Since the number of rotations of the hydraulic motor 42 is lower than the number of revolutions of the front wheel 15, the number of revolutions of the hydraulic motor 42 is reduced in the high-speed traveling. Thus, the output due to the hydraulic pressure loss or lowering of mileage can be prevented.

Here, the lowering of the output or the mileage during high-speed traveling in a case wherein the diameter of the driven gear is set to be larger than the diameter of the drive gear, as shown in Jp-A-2000-229596, will be described.

When the diameter of the driven gear is set to be larger than the diameter of the drive gear, the number of revolutions of the front wheel becomes smaller than the number of revolutions of the hydraulic motor. Since the speed of revolution of the hydraulic motor needs to be as high as several times the number of revolutions of the front wheel, the hydraulic motor needs to be rotated at high speed during operation at a high-speed.

Although the hydraulic motor circulates oil pressure with respect to the hydraulic pump, when the flow velocity of the oil pressure is increased, the resistance in the flow path abruptly increases at the rate of a square of the flow rate. The resistance in the flow path appears as a loss, and the amount of output subtracted from the output transmitted to the hydraulic pump by the engine by the loss of the resistance in the flow path is outputted for driving the front wheel.

In other words, during high-speed operation, the loss is increased and the output for driving the front wheel is decreased.

Consequently, a lowering of the output results. The mileage is also lowered corresponding to the loss.

In contrast, according to the present invention, since the diameter of the driven gear can be set to be smaller than the diameter of the drive gear, the number of revolutions of the hydraulic motor 42 is reduced. Thus, a lowering of the output or mileage due to a loss of the hydraulic pressure can be restrained in the high-speed traveling.

In FIG. 5(a), since the output shaft 77 of the hydraulic motor 42 is arranged so as to be inclined with respect to the front wheel axle 14 by employing the bevel gears as the drive gear 65 and the driven gear 64 and arranging the bevel gears so that the smaller diameter portions 81 of the bevel gears face toward the inside of the recess portion 53, the seal member 72 for sealing between the hub 51 and the cover 55 can be arranged on the rear side of the drive gear 65 without upsizing the hub 51 in the direction of the axle.

Since the output shaft 77 of the hydraulic motor 42 is arranged so as to be inclined with respect to the axle 14, even when the diameter 85 of the driven gear 64 provided on the hub 51 is set to be smaller than the diameter 84 of the drive gear 65 provided on the output shaft 77, it is not necessary to upsize the hub 51 in the radial direction. Thus, the drive gear 65 and the driven gear 64 can be arranged around the axle 14 of the front wheel 15.

Although the present invention is applied to a motorcycle in this embodiment, it is also applicable to a tricycle, and also can be applied to general vehicles without problem.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An all-wheel-drive motorcycle wherein an engine drives a rear wheel and a hydraulic pump, and oil pressure generated by the hydraulic pump is supplied to a hydraulic motor for driving a front wheel comprising:
   a front wheel hub provided on the front wheel, said front wheel hub including a cup-shaped hub provided with a recess portion, the recess portion of the hub being covered by a cover and the hydraulic motor being supported by the cover;
   a drive gear is provided on an output shaft of the hydraulic motor; and
   a driven gear is provided in the recess portion of the hub;
   wherein the driven gear is provided on the side of an axle of the front wheel,
   an output shaft of the hydraulic motor is arranged so as to be inclined with respect to the axle of the front wheel and the drive gear and the driven gear are bevel gears, and the bevel gears are arranged so that smaller diameter portions face toward the inside of the recess portion, and
   the front wheel hub includes a boss portion extending inwardly therefrom and further including a sleeve being fixed to the boss portion and bearings mounted between the axle of the front wheel and the sleeve for permitting rotation therebetween.

2. The all-wheel-drive motorcycle according to claim 1, wherein the diameter of the drive gear is larger than the diameter of the driven gear.

3. The all-wheel-drive motorcycle according to claim 1, wherein the driven gear is mounted on said sleeve for imparting rotation to said sleeve and said boss portion of said front wheel hub for rotating said front wheel.

4. The all-wheel-drive motorcycle according to claim 1, wherein a bearing is positioned at one end of the sleeve and a needle bearing is positioned at the other end of the sleeve and further including a collar member disposed between the bearing and the needle bearing for limiting axial movement therebetween.

5. The all-wheel-drive motorcycle according to claim 1, wherein the driven gear has a predetermined pitch circle and the drive gear has a predetermined pitch circle and the pitch circle of the driven gear is larger relative to the pitch circle of the drive gear.

6. The all-wheel-drive motorcycle according to claim 1, and further including an oil control means for regulating the amount of oil supplied to said hydraulic motor.

7. The all-wheel-drive motorcycle according to claim 6, wherein the oil control means includes a pressurizing tank, an operation switching means for switching to a discharging port, a check valve and a safety valve for ensuring the proper supply of oil to said hydraulic motor.

8. A hydraulic motor for use with an all-wheel-drive vehicle wherein hydraulic pressure is generated by an engine and is supplied to the hydraulic motor for driving a front wheel comprising:
a front wheel hub having a cup-shaped hub provided with a recess portion, the recess portion of the hub being covered by a cover and the hydraulic motor being supported by the cover;
a drive gear is provided on an output shaft of the hydraulic motor; and
a driven gear is provided in the recess portion of the hub;
wherein the driven gear is provided on the side of an axle of a front wheel, and
wherein an output shaft of the hydraulic motor is arranged so as to be inclined with respect to the axle of the front wheel and the drive gear and the driven gear are bevel gears, and the bevel gears are arranged so that smaller diameter portions face toward the inside of the recess portion.

9. The hydraulic motor for use with an all-wheel-drive vehicle according to claim 8, wherein the diameter of the drive gear is larger than the diameter of the driven gear.

10. The hydraulic motor for use with an all-wheel-drive vehicle according to claim 8, wherein the front wheel hub includes a boss portion extending inwardly therefrom and further including a sleeve being fixed to the boss portion and bearings mounted between the axle of the front wheel and the sleeve for permitting rotation therebetween.

11. The hydraulic motor for use with an all-wheel-drive vehicle according to claim 8, wherein the driven gear is mounted on said sleeve for imparting rotation to said sleeve and said boss portion of said front wheel hub for rotating said front wheel.

12. The hydraulic motor for use with an all-wheel-drive Vehicle according to claim 8, wherein a bearing is positioned at one end of the sleeve and a needle bearing is positioned at the other end of the sleeve and further including a collar member disposed between the bearing and the needle bearing for limiting axial movement therebetween.

13. The hydraulic motor for use with an all-wheel-drive vehicle according to claim 8, wherein the driven gear has a predetermined pitch circle and the drive gear has a predetermined pitch circle and the pitch circle of the driven gear is larger relative to the pitch circle of the drive gear.

14. The hydraulic motor for use with an all-wheel-drive vehicle according to claim 8, and further including an hydraulic fluid control means for regulating the amount of hydraulic fluid supplied to said hydraulic motor.

15. The hydraulic motor for use with an all-wheel-drive vehicle according to claim 14, wherein the hydraulic fluid control means includes a pressurizing tank, an operation switching means for switching to a discharging port, a check valve and a safety valve for ensuring the proper supply of hydraulic fluid to said hydraulic motor.

16. An all-wheel-drive motorcycle wherein an engine drives a rear wheel and a hydraulic pump, and oil pressure generated by the hydraulic pump is supplied to a hydraulic motor for driving a front wheel comprising:
a front wheel hub provided on the front wheel, said front wheel hub including a cup-shaped hub provided with a recess portion, the recess portion of the hub being covered by a cover and the hydraulic motor being supported by the cover;
a drive gear is provided on an output shaft of the hydraulic motor; and
a driven gear is provided in the recess portion of the hub;
wherein the driven gear is provided on the side of an axle of the front wheel,
wherein an output shaft of the hydraulic motor is arranged so as to be inclined with respect to the axle of the front wheel and the drive gear and the driven gear are bevel gears, and the bevel gears are arranged so that smaller diameter portions face toward the inside of the recess portion.

* * * * *